United States Patent
Sze (10) Patent No.: US 10,905,216 B2
(45) Date of Patent: Feb. 2, 2021

(54) HAIR COMB

(71) Applicant: Tung Hing Plastic Manufactory Ltd., Kowloon (CN)

(72) Inventor: Ka Chuen Sze, Kowloon (CN)

(73) Assignee: TUNG HING PLASTIC MANUFACTORY LTD., Kowloon (CN)

( * ) Notice: Subject to any disclaimer, the term of this patent is extended or adjusted under 35 U.S.C. 154(b) by 0 days.

(21) Appl. No.: 14/668,094

(22) Filed: Mar. 25, 2015

(65) Prior Publication Data

US 2016/0278500 A1 Sep. 29, 2016

(51) Int. Cl.
*A45D 24/04* (2006.01)
*B29C 45/00* (2006.01)
*B29L 21/00* (2006.01)

(52) U.S. Cl.
CPC ............ *A45D 24/04* (2013.01); *B29C 45/006* (2013.01); *B29L 2021/005* (2013.01)

(58) Field of Classification Search
CPC ........ A45D 24/00; A45D 24/02; A45D 24/08; A45D 24/16; A45D 24/04
USPC ................................................. 132/156, 106
See application file for complete search history.

(56) References Cited

U.S. PATENT DOCUMENTS

| | | | | |
|---|---|---|---|---|
| 2,799,283 A * | 7/1957 | Kapusnyk | ............. | A45D 24/16 132/120 |
| 2,920,334 A * | 1/1960 | Keller | .................... | A45D 24/04 15/176.1 |
| 3,010,459 A * | 11/1961 | Lerner | ..................... | A45D 2/00 132/148 |
| 3,142,305 A * | 7/1964 | Cosby | .................... | A45D 24/04 132/155 |
| 4,549,559 A * | 10/1985 | Gueret | ................... | A45D 24/00 132/219 |
| 2002/0023657 A1* | 2/2002 | Gueret | ................. | A45D 40/265 132/218 |
| 2004/0097831 A1* | 5/2004 | Bourne | .............. | A61B 10/0266 600/564 |
| 2006/0076030 A1* | 4/2006 | De Laforcade | ........ | A45D 19/02 132/142 |
| 2006/0225763 A1* | 10/2006 | Lau | .......................... | A45D 8/20 132/277 |

(Continued)

FOREIGN PATENT DOCUMENTS

CN 203828301 U 9/2014
GB 242789 * 11/1924

*Primary Examiner* — Rachel R Steitz
*Assistant Examiner* — Brianne E Kalach
(74) *Attorney, Agent, or Firm* — Heslin Rothenberg Farley & Mesiti P.C.; Kristian E. Ziegler, Esq.; Melvin Li, Esq.

(57) ABSTRACT

There is provided a hair comb. The comb has a utility member made of a first polymeric material for engaging hair and scalp of a user in use and a splint portion made of a second material for providing rigidity to the utility member and to act as a handle for user's grip. The splint member is substantially stiffer than the utility member, wherein the splint member has a flexural strength of at least 40 Mpa and a hardness of at least Shore D 75, and the first polymeric material is selected from a group selected from thermoplastics polyester elastomer (TPE-E), polyether block amide copolymer (TPE-A), ethylene-vinyl acetate (EVA), polyurethane (PU) and polyethylene (PE).

22 Claims, 8 Drawing Sheets

(56) References Cited

U.S. PATENT DOCUMENTS

| | | | |
|---|---|---|---|
| 2006/0283473 A1* | 12/2006 | Chudzik | A45D 24/02 132/125 |
| 2008/0110471 A1 | 5/2008 | Oliver et al. | |
| 2013/0055518 A1* | 3/2013 | Jacob | A46D 1/02 15/160 |
| 2014/0056636 A1* | 2/2014 | Gueret | A45D 19/02 401/268 |

* cited by examiner

Section A-A
Fig. 1D
Prior Art

Section B-B
Fig. 1C
Prior Art

HAIR COMB

FIELD OF THE INVENTION

The present invention is concerned with a hair management tool and in particular a hair comb.

BACKGROUND OF THE INVENTION

There are different types of hair management tools in the market to tailor different needs of users. One particular type of hair management tool is hair comb. Conventional hair comb is typically thin in configuration and with relatively stiff tooth members projected from a splint member. Such structure has been adopted by most conventional hair comb types in the market for a long time. This is because these conventional hair combs can be easily made from both technical and cost points of view, by injecting one polymeric material into a mould to form integral splint and tooth members simultaneously. The comb including the splint and the teeth quickly become solidified in the mould after cooling. Due to the low cost, these conventional hair combs are often provided in some hotels to guest as disposable items or for use on complimentary basis.

Among other problems, one problem with such conventional combs is that they are often unable to meet users' needs. For example, the teeth of such combs are often too stiff and can cause irritation to users with sensitive scalps.

The present invention seeks to address such problem or at least to provide an alternative to the public.

SUMMARY OF THE INVENTION

According to a first aspect of the present invention, there is provided a hair comb comprising a utility member (utility member) made of a first polymeric material for engaging hair and scalp of a user in use and a splint member (splint portion) made of a second material for providing rigidity to the utility member and to act as a handle for user's grip, the splint member is substantially stiffer than the utility member, wherein the splint member has a flexural strength of at least 40 Mpa and a hardness of at least Shore D 75, and the first polymeric material is selected from a group including thermoplastics polyester elastomer (TPE-E), polyether block amide copolymer (TPE-A), ethylene-vinyl acetate (EVA), polyurethane (PU) and polyethylene (PE). In particular, thermoplastics polyester elastomer (TPE-E), polyether block amide copolymer (TPE-A), ethylene-vinyl acetate (EVA), polyurethane (PU) and polyethylene (PE) are particular suitable materials in that utility member made thereof can interact with hair and scalp of a user more efficiently and/or comfortably.

Preferably, the utility member may have a flexural strength of 31 Mpa ±10% and a hardness of Shore D 55 ±10%.

Suitably, the second material may be selected from the group consisting polypropylene (PP), general purpose polystyrene polymer (GPPS), high impact polystyrene (HIPS), acrylic, polycarbonate (PC), acrylonitrile butadiene (ABS), nylon, polyoxymethylene (POM) and acetate.

In an embodiment, the utility member may be connected to the splint member by overmolding the second material to the utility member.

In one embodiment, the comb may comprise connection means for connecting, or removably connecting, the utility member and the splint member together. The connection means may include a socket provided in the splint member for receiving the utility member, and may be configured such that during assembly the utility member is slid in a lateral direction into a groove portion defined by the socket and after assembly the utility member is prevented from disengagement from the splint member in a direction perpendicular to the lateral direction. Alternatively, the connection means may include latches for securing the utility member to the splint member. Yet alternatively, the utility member and the splint member may be connected together by glue. Yet alternatively, the utility member and the splint member may be connected together by soldering. Yet alternatively, the utility member and the splint member may be connected together by snap-fitting.

Suitably, the utility member may include one row of projections or tooth members. In a specific embodiment, the utility member may include only one row of the projections or tooth members.

According to a second aspect of the present invention, there is provided a method of manufacture of a hair comb, comprising the steps of preparing a utility member of the comb by injecting a first polymeric material selected from a group including a group including thermoplastics polyester elastomer (TPE-E), polyether block amide copolymer (TPE-A), ethylene-vinyl acetate (EVA), polyurethane (PU) and polyethylene (PE) into a mould, preparing a splint member of the comb by injecting a second material into a mould, the splint member made from a second material substantially stiffer than the utility member made from the first polymeric material, wherein the splint member has a flexural strength of at least 40 Mpa and a hardness of at least Shore D 75.

Preferably, the utility member may have a flexural strength of 31 Mpa ±10% and a hardness of Shore D 55 ±10%.

Suitably, the second material may be selected from the group consisting polypropylene (PP), general purpose polystyrene polymer (GPPS), high impact polystyrene (HIPS), acrylic, polycarbonate (PC), acrylonitrile butadiene (ABS), nylon, polyoxymethylene (POM) and acetate.

Advantageously, the utility member may be connected to the splint member by overmolding the second material to the utility member.

In an embodiment, the method may comprise provision of connection means for connecting or removably connecting the utility member and the splint member together.

In one embodiment, the method may comprise provision a socket provided in the splint member for receiving the utility member, the connection means may be configured such that during assembly the utility member is slid in a lateral direction into a groove portion defined by the socket and after assembly the utility member is prevented to disengagement from the splint member in a direction perpendicular to the lateral direction. Alternatively, the method may comprise provision of latches for securing the utility member to the splint member. Yet alternatively, the method may comprise a step of connecting the utility member and the splint member are together by gluing. Yet alternatively, the method may comprise a step of connecting the utility member and the splint member together by soldering. Yet alternatively, the method may comprise a step of connecting the utility member and the splint member together by snap-fitting.

Suitably, the utility member may include one row of projections or tooth members, or only one row of the projections or tooth members.

BRIEF DESCRIPTION OF THE DRAWINGS

Some embodiments of the present invention will now be explained, with reference to the accompanied drawings, in which.

DETAILED DESCRIPTION OF PREFERRED EMBODIMENTS OF THE INVENTION

Figures 1A, 1B, 1C, 1D:
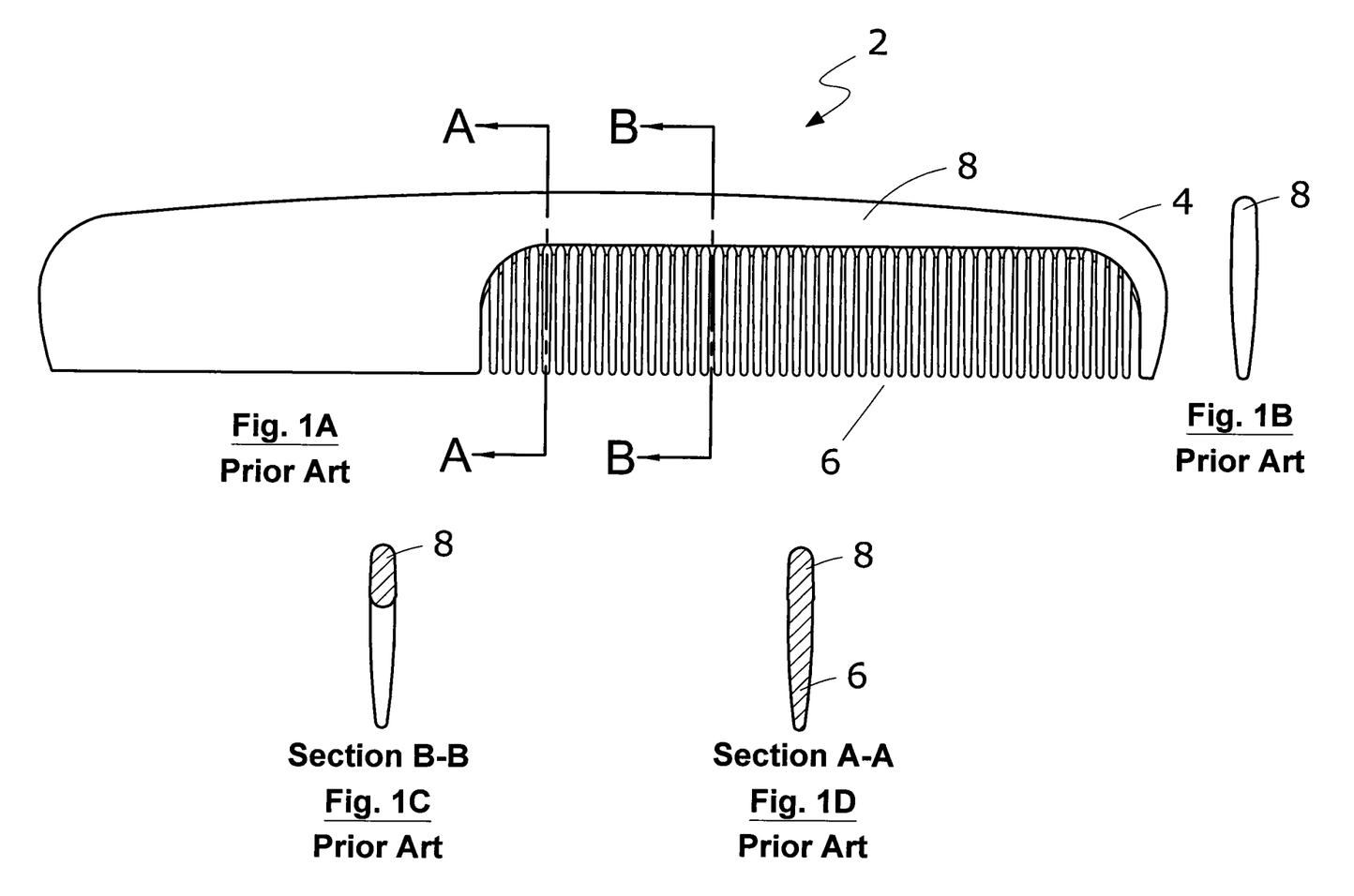
FIG. 1A is a schematic diagram showing a side view of a conventional hair comb.
FIG. 1B is an end view from front of the comb of FIG. 1A.
FIG. 1C is an end view from front of the comb of FIG. 1A when the comb is cut at section A-A.
FIG. 1D is an end view from front of the comb of FIG. 1A when the comb is cut at section B-B.

FIG. 1A is a side view of a prior art hair comb 2. FIG. 1B is a view from front end 4 of the comb 2. FIG. 1C is a cross section view taken at A-A shown in FIG. 1A. FIG. 1D is a view from front end 4 of the comb 2 with front portion thereof removed at cross section B-B. From these figures, and in particular FIG. 1C, it is shown that the comb 2 is formed integrally from one material. The material may for example be a polymeric material which is relatively stiff. Such polymeric material may typically be selected from a group including polypropylene (PP), general purpose polystyrene polymer (GPPS), high impact polystyrene (HIPS), acrylic, polycarbonate (PC), acrylonitrile butadiene (ABS), nylon, polyoxymethylene (POM) and acetate. Due to the use of the same relatively stiff material, a utility member 6 and a splint member 8 of the comb 2 generally have similar degree of stiffness or rigidity.

Figures 2A, 2B, 2D:
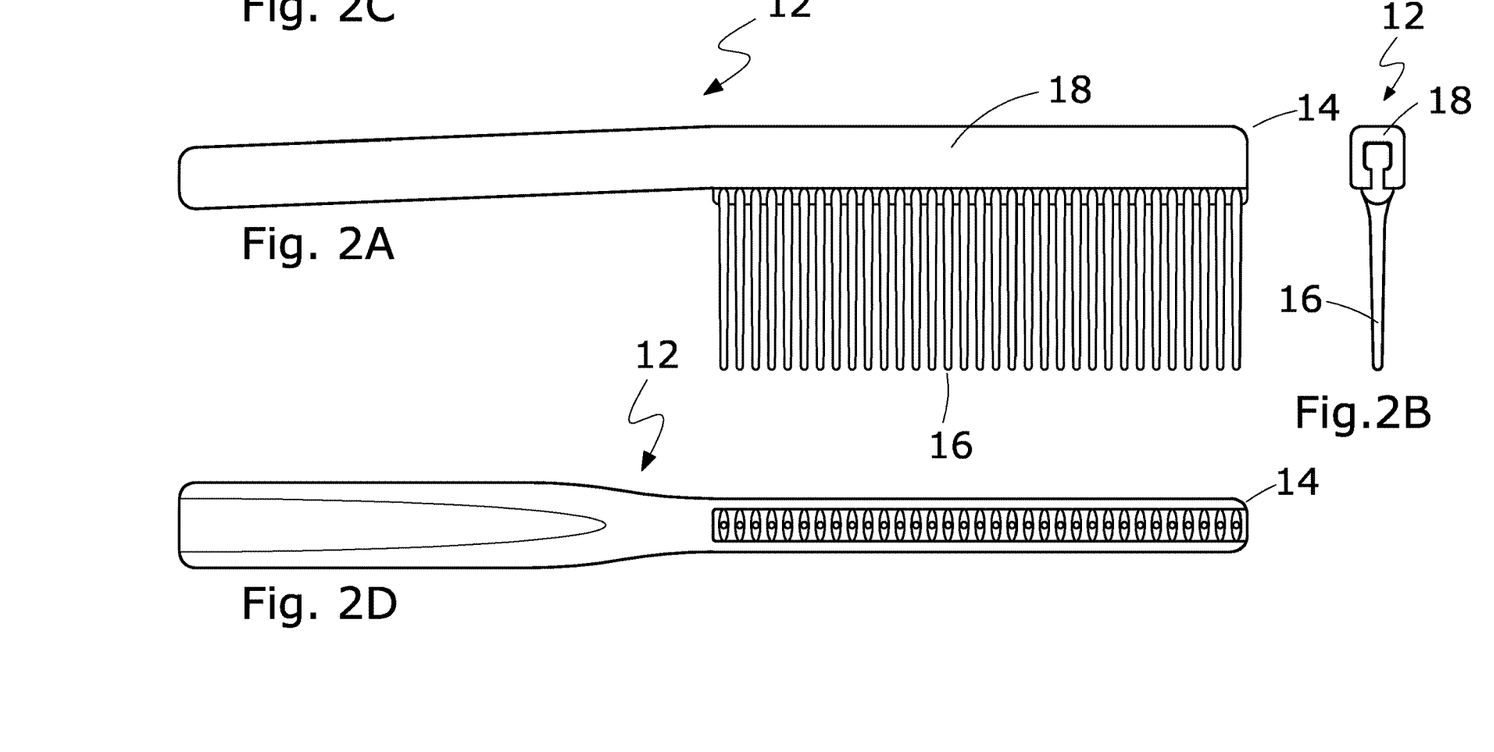
FIG. 2A is a schematic diagram showing a side view of an embodiment of a novel hair comb according to the present invention.
FIG. 2B is an end view from front of the comb of FIG. 2A.
FIG. 2D is a view from bottom of the comb of FIG. 2A.
Figure 2C:
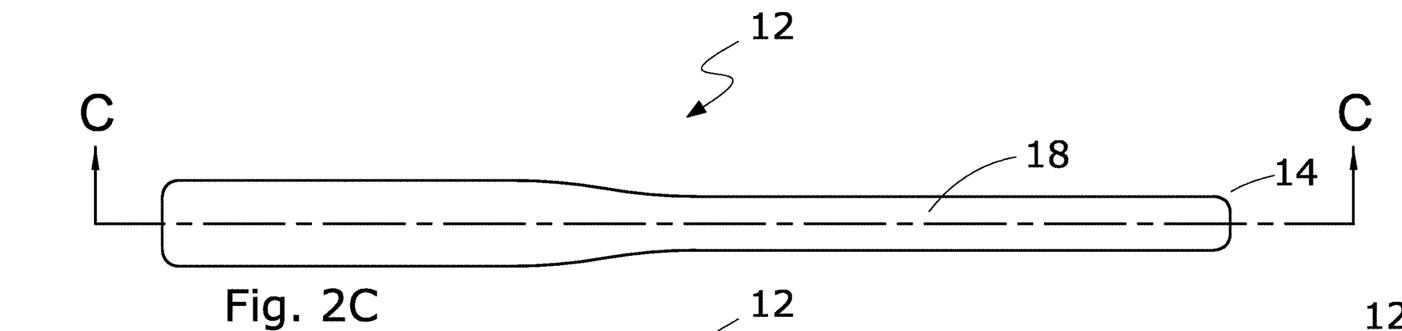
FIG. 2C is a view from above of the comb of FIG. 2A.

FIG. 2A is a cross section view of an embodiment of a hair comb 12 in accordance with the present invention. FIG. 2B is an end view showing a front end of the comb. FIG. 2C is a view from above of the comb 12. The cross section view of the hair comb 12 is actually taken at section C-C in FIG. 2C. FIG. 2D is a view from bottom of the comb. FIG. 2C shows that the comb 12 has two distinct members, namely a splint member (splint portion) 18 and a utility member (utility portion) 16. The splint member 18 is elongate in profile and defines a longitudinal axis. The splint member 18 serves to provide rigidity for the comb 12 such in use the comb 12 would not flex or would not significantly flex away from the longitudinal axis. The splint member 8 is made from a material selected from a group of polypropylene (PP), general purpose polystyrene polymer (GPPS), high impact polystyrene (HIPS), acrylic, polycarbonate (PC), acrylonitrile butadiene (ABS), nylon, polyoxymethylene (POM) and acetate. The materials of polypropylene (PP), general purpose polystyrene polymer (GPPS), high impact polystyrene (HIPS), acrylic, polycarbonate (PC), acrylonitrile butadiene (ABS), nylon, polyoxymethylene (POM) and acetate are particular suitable technically to achieve an appropriate stiffness for use in this invention. The splint member 18 has a flexural strength of at least 40 Mpa and a hardness of at least Shore D 75.

FIG. 2B shows that the splint member 18 is configured with an elongate recess 20 extending along the longitudinal axis of the splint member 18. Please also see FIGS. 4A-4B. The elongate recess 20 is defined by circumferential surrounding wall 22 of the splint member 18. The surrounding wall 22 has a cut-out region from below and an opening 28 at the front end of the comb 12 of the splint member 18. The surrounding wall 22 has a pair of oppositely facing lips 24a, 24b defining a gap 26 therebetween via which teeth of the utility member 16 protrude when the utility member 18 is assembled to the splint member 18. Please also see FIGS. 6B, 6C and 7A.

Figures 3A, 3B, 3C:
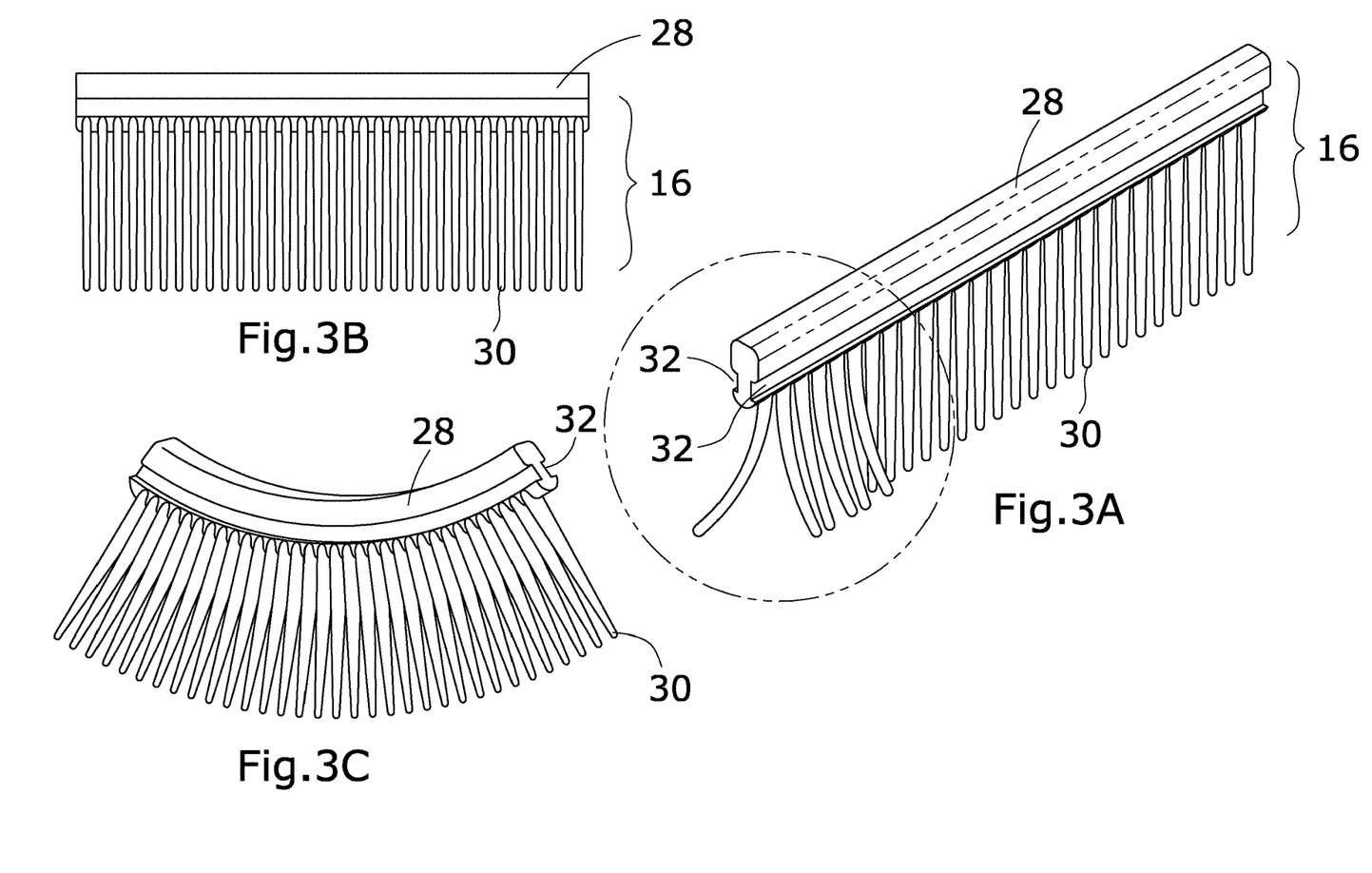
FIG. 3A is a perspective view showing a utility member of the comb of FIG. 2A.
FIG. 3B is a side view showing the utility member of FIG. 3A.
FIG. 3C is a perspective view showing the utility member of FIG. 3B in an alternative configuration.

For purpose of illustration, FIGS. 3A-3C show different configurations of the distinct utility member 16 by itself. The utility member 16 has a thickened back member 28 arranged at a top side thereof, and a plurality of thinner tooth members 30 extended from the back member 28. The thickened back member 28 however has a narrower neck portion 32. The utility member 16 is made from a material which is less stiff from the tooth members 30. In particular, thermoplastics polyester elastomer (TPE-E), polyether block amide copolymer (TPE-A), ethylene-vinyl acetate (EVA), polyurethane (PU) and polyethylene (PE) or similar material are particularly suitable in achieving the lower stiffness. Among these materials, research leading to the present invention shows that thermoplastics polyester elastomer (TPE-E) and polyether block amide copolymer (TPE-A) are particular suitable. In preferred embodiments, the utility portion has a flexural strength of 31 Mpa ±10% and a hardness of Shore D 55 ±10%.

The back member 28 is sized and shaped to fit into the elongate recess 20 of the splint member 18.

Figures 4A, 4B, 4C:
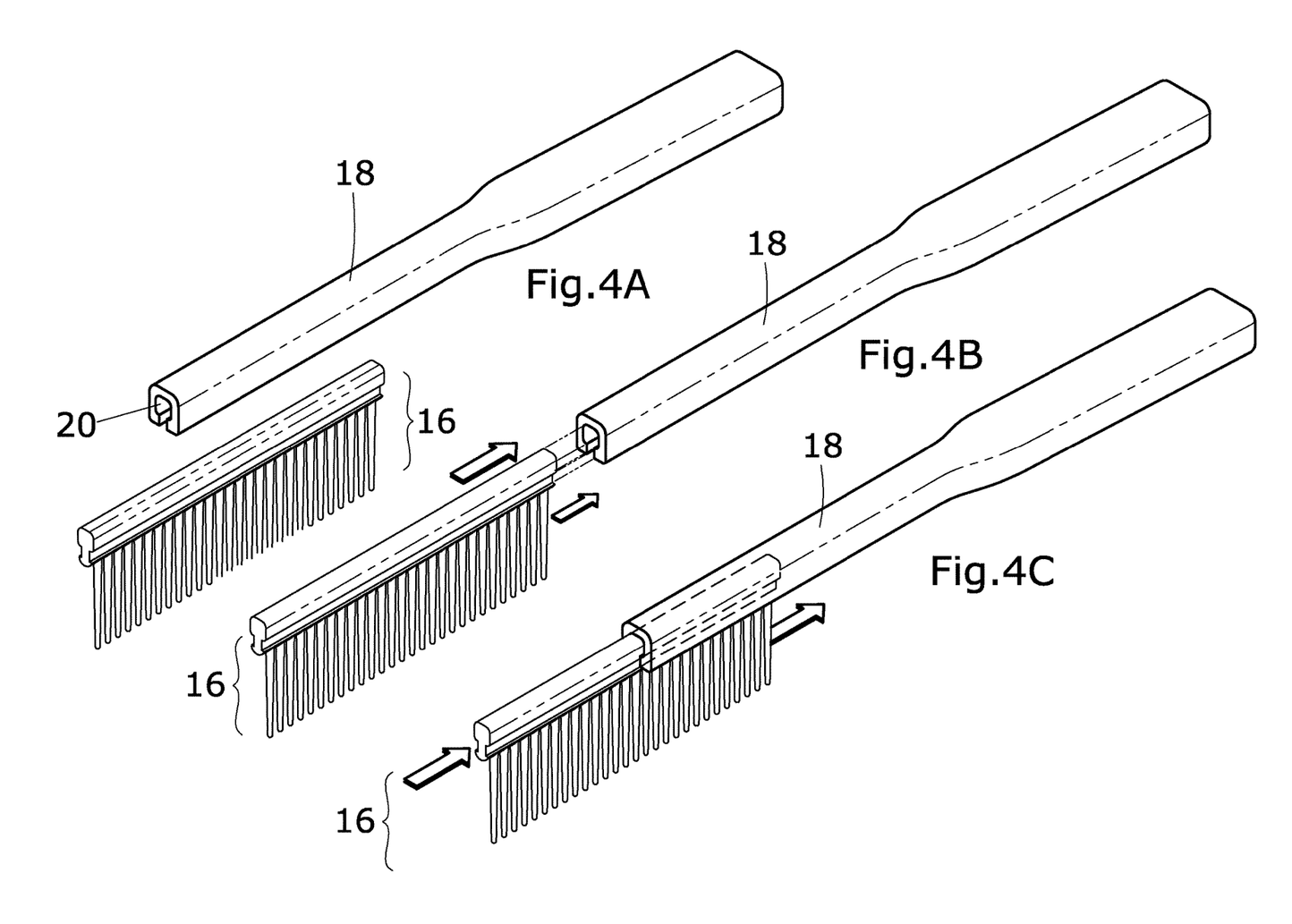
FIG. 4A is a perspective view of the comb of FIG. 2A in a dissembled configuration.
FIGS. 4B-4C are perspective views showing the comb of FIG. 4A being assembled together.

FIGS. 4A-4C are a series of diagrams showing assembly of the utility member 16 to the splint member 18. The elongate recess 20 of the splint member 18 and the back member 28 of the utility member 16 are complementary in configuration such that the back member 28 or at least part of the back member 28 is fittable within the elongate recess 20 by laterally sliding the back member 28 of the utility member 16 from the front end 14 of the splint member 18. Once fitted within the recess 20, the lips 24a and 24b of the splint member 18 abut the neck portion 32 of the back member 28, thus preventing the utility portion 16 from moving in a direction perpendicular to the longitudinal direction.

Figure 5:
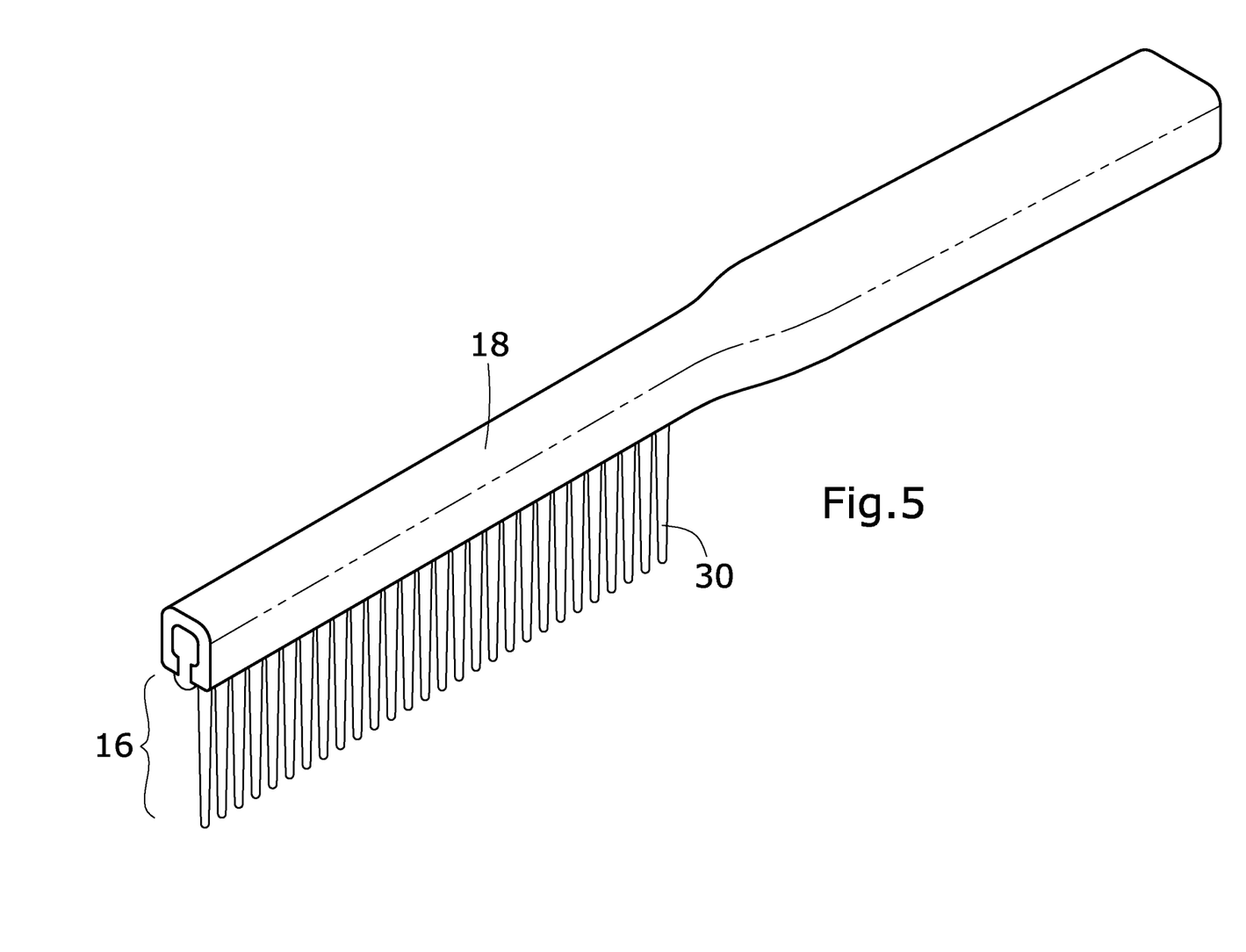
FIG. 5 is a perspective view showing the comb of FIG. 4A in an assembled configuration.
Figures 6A, 6B, 6C:
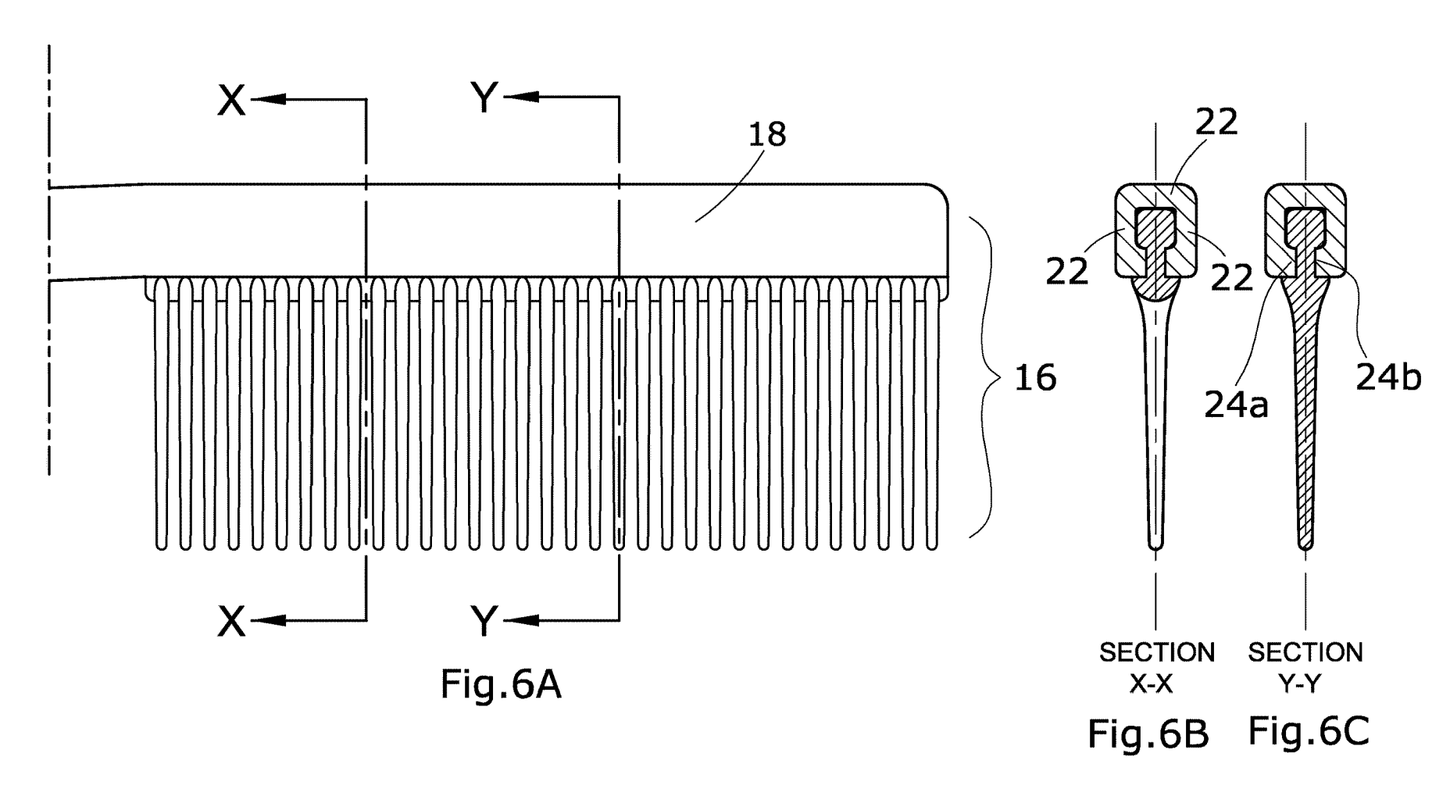
FIG. 6A is a side view of a front member of the comb of FIG. 5A.
FIG. 6B is an end view of the front member of FIG. 5A when the comb is cut at section X-X of the comb.
FIG. 6C is an end view of the front member of FIG. 5A when the comb is cut at section Y-Y of the comb.

FIGS. 6A-6C show the splint member 18 and the utility member 16 engage with each other. FIG. 5 shows the comb 12 in an assembled configuration.

Figures 7A, 7C, 7D:
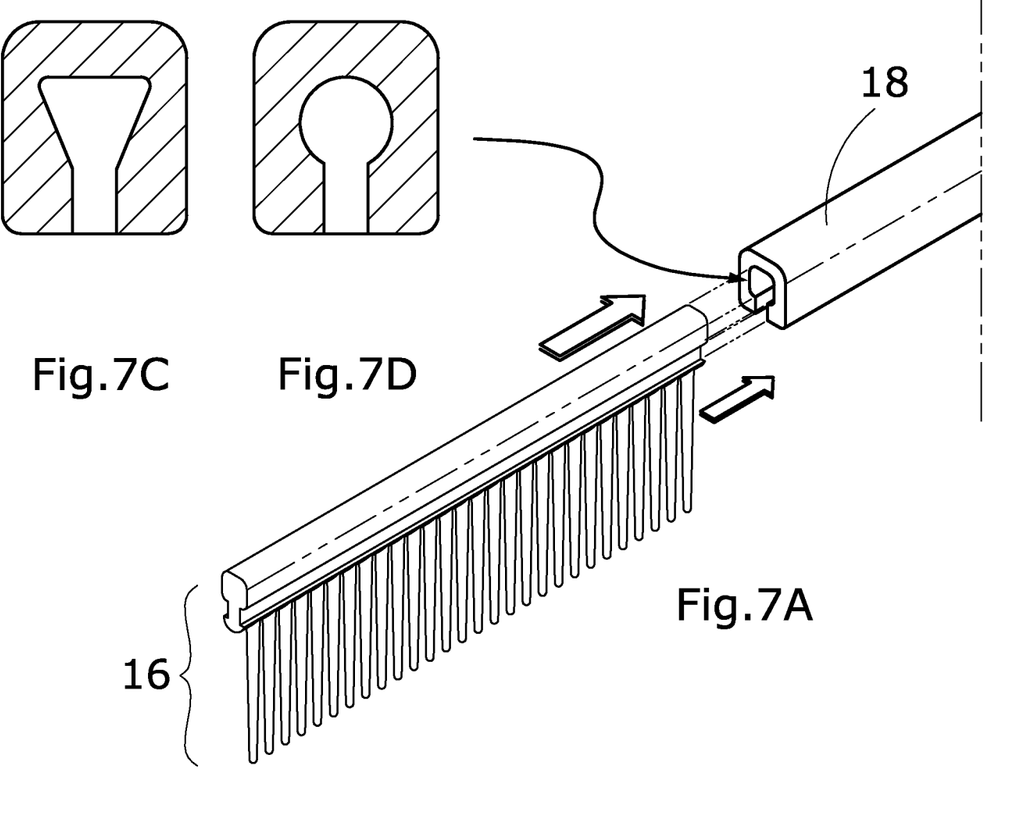
FIG. 7A corresponds to FIG. 4A.
FIG. 7C is an alternative embodiment of splint member for use in a comb in accordance with the present invention.
FIG. 7D is an alternative embodiment of splint member for use in a comb in accordance with the present invention.
Figure 7B:
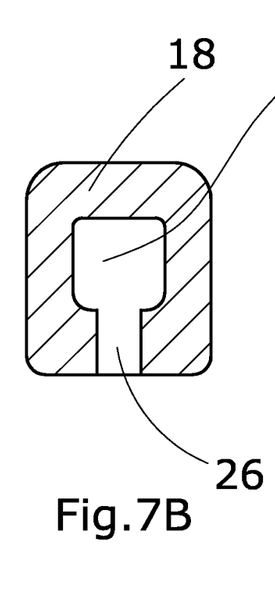
FIG. 7B is an embodiment of a splint member of the comb of FIG. 4B.

A particular embodiment of engagement of the splint member 18 and the utility member 16 of the comb 12 is shown in FIG. 7B. It is shown that the elongate recess 20 has a generally rectangular shaped cross section and with a narrow gap 26 defined by the oppositely facing lips 24a, 24b, other specific configurations are possible. For example, FIG. 7C shows an alternative embodiment of engagement in which the elongate recess has a generally triangular shaped cross section and with a similar narrow gap defined by the oppositely facing lips of the splint member; and FIG. 7D shows an alternative embodiment of engagement in which the elongate recess has a generally circular shaped cross section and with a similar narrow gap defined by the oppositely facing lips of the splint member.

Figure 8:
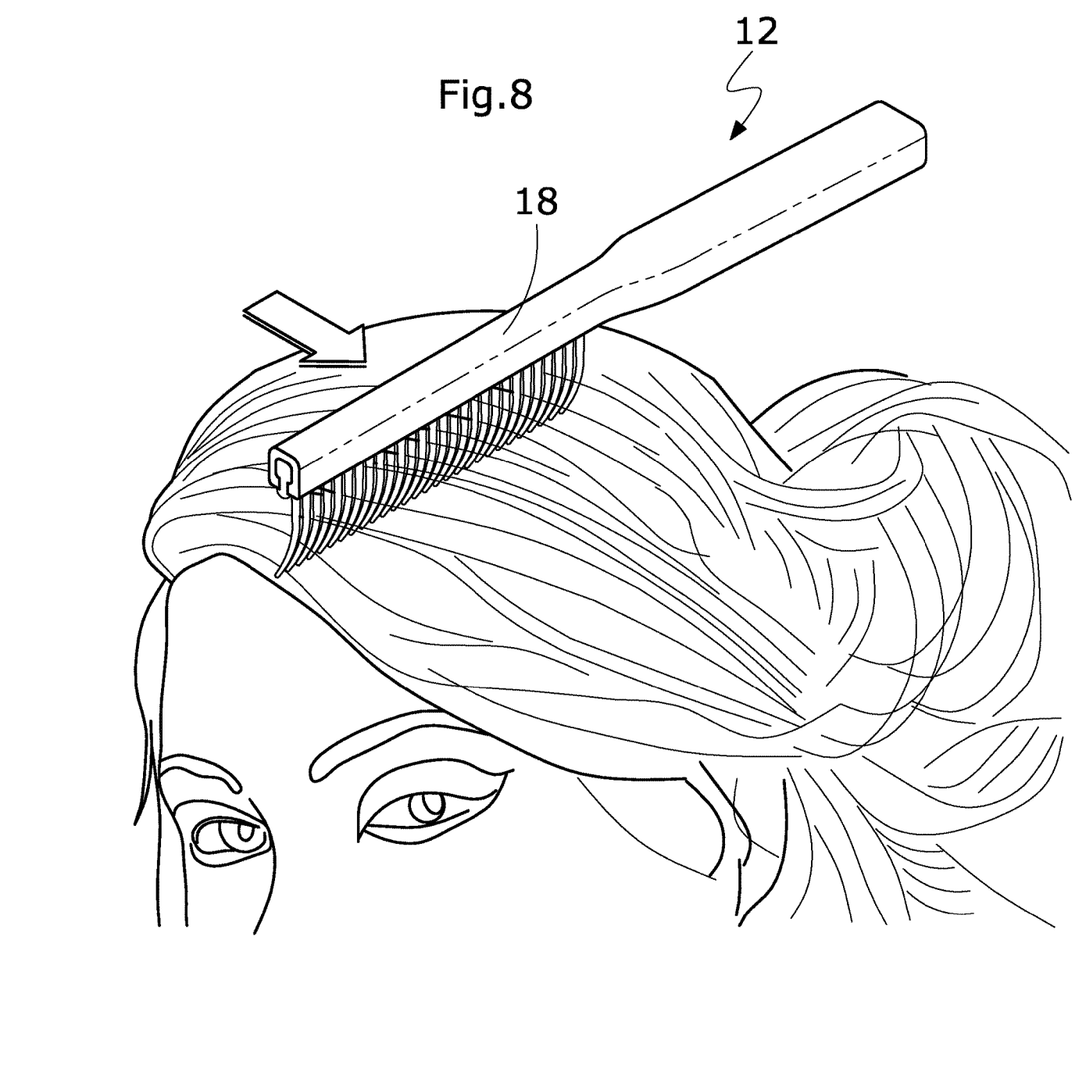
FIG. 8 is a schematic diagram showing use of the comb in FIG. 2A by a user.

FIG. 8 shows the behavior of the comb by a user during use. It is to be understood that due to the use of two different materials of the utility member and the splint member, the teeth possess a substantially softer behavior and can flex more easily when engaging the hair and scalp of the user, and yet the splint portion provide sufficiently stiff physical properties. The use of the particular softer materials, or materials with a flexural strength of 31 Mpa ±10% and a hardness of Shore D 55 ±10%, as stipulated above is against wisdom of a skilled person. This is because materials of thermoplastics polyester elastomer (TPE-E), polyether block amide copolymer (TPE-A), ethylene-vinyl acetate (EVA), polyurethane (PU) and polyethylene (PE) are less or non-heat resistant and could not sustain typical use of hair comb while the comb is being used to comb and hot-air blow drying.

In the above embodiments, the utility member is removably assembled to or disassembled from the splint member. However, other embodiments not departing from the inventive concept have different designs. For example, in alternative embodiments the utility member and the splint member after assembly may be fixedly connected together by gluing, soldering or snap-fitting such that the utility member would not be accidently disengaged from the splint portion in use.

Alternatively, in a different embodiment the utility portion may include more than one row of teeth, e.g. two rows of teeth projecting from back member of the comb.

An embodiment of a method of manufacture of a hair comb in accordance with the present invention includes steps of preparing a utility portion of the comb by injecting a first polymeric material selected from a group including thermoplastics polyester elastomer (TPE-E), polyether block amide copolymer (TPE-A), ethylene-vinyl acetate (EVA), polyurethane (PU) and polyethylene (PE) into a mould, preparing a splint portion of the comb by injecting a second material into a mould, the splint portion made from a second material substantially stiffer than the utility portion made from the first polymeric material. In preferred embodiments, the splint portion has a flexural strength of at least 40 Mpa and a hardness of at least Shore D 75. The specific combination of use of these different materials provide the desired physical characteristics desired by the use of such comb. Other characteristics are already discussed above and are not repeated here for brevity.

The splint portion and the utility portion may be made such that they are removably connected together. For example, the utility portion may be connected to the splint portion in a sliding manner. Alternatively, they may be configured such that they are fixedly engaged together. In these alternative embodiments, the comb may comprise connection means for connecting the utility portion and the splint portion together. For example, the comb may comprise a socket provided in the splint portion for receiving the utility portion, and the connection means is configured such that during assembly the utility portion is slid in a lateral direction into a groove portion defined by the socket and after assembly the utility portion is prevented to disengagement from the splint portion in a direction perpendicular to the lateral direction. Yet alternatively, the comb may provide latches for securing the utility portion to the splint portion. Yet further alternatively, the method may provide a step of connecting the utility portion and the splint portion are together by gluing, soldering, or snap-fitting.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose.

The invention claimed is:

1. A hair comb, comprising:
   a utility member for engaging hair and scalp of a user in use, the utility member consisting of only a single row of teeth defining a longitudinal length and made of only a first polymeric material, and
   a splint member comprising a first portion that is connected to the utility member along the longitudinal length that provides rigidity to the utility member and a second portion that extends from the first portion and past the utility member that forms a handle of the comb for a user's grip and defines a free end spaced from the utility member, the splint member being made of only a second polymeric material that differs from the first polymetric material,
   wherein the first polymeric material is selected from the group consisting of ethylene-vinyl acetate (EVA), polyurethane (PU) and thermoplastics polyester elastomer (TPE-E), and the second polymeric material is selected from the group consisting of general purpose polystyrene polymer (GPPS), high impact polystyrene (HIPS), acrylic, acrylonitrile butadiene (ABS), nylon, polyoxymethylene (POM) and acetate,
   wherein the splint member is stiffer and harder than the utility member; and
   wherein the utility member is manufactured such that the first polymeric material and the physical configuration of the utility member are configured such that they provide the utility member with a flexural strength of 31 Mpa ±10% and a hardness of Shore D 55 ±10%, and the splint member is manufactured such that the second polymeric material and the physical configuration of the splint member are configured such that they provide the splint member with a flexural strength of at least 40 Mpa and a hardness of at least Shore D 75.

2. A comb as claimed in claim 1, wherein the utility member is connected to the splint member by overmolding the second polymeric material to the utility member.

3. A comb as claimed in claim 1, comprising connection means for connecting the utility member and the splint member together.

4. A comb as claimed in claim 3, wherein the connection means includes a socket provided in the splint member for receiving the utility member, the connection means is configured such that during assembly the utility member is slid in a lateral direction into a groove portion defined by the socket and after assembly the utility member is prevented from disengagement from the splint member in a direction perpendicular to the lateral direction.

5. A comb as claimed in claim 4, wherein the utility member extends out from the socket of the splint member in the direction perpendicular to the lateral direction along its entire length in the lateral direction after assembly of the utility member and the splint member.

6. A comb as claimed in claim 4, wherein the splint member includes a pair of oppositely facing lips defining a gap therebetween that extends along the lateral direction and is in communication with the groove, and wherein the utility member protrudes through the gap and extends along an outer surface of the lips after assembly of the utility member and the splint member.

7. A comb as claimed in claim 4, wherein the socket of the splint member includes a gap that extends along the lateral direction and defines an opening into the socket, and wherein the utility member includes a portion that is exterior to the socket after assembly of the utility member and the splint member and is wider than the gap portion.

8. A comb as claimed in claim 3, wherein the connection means includes latches for securing the utility member to the splint member.

9. A comb as claimed in claim 3, wherein the utility member and the splint member are connected together by glue.

10. A comb as claimed in claim 3, wherein the utility member and the splint member are connected together by soldering.

11. A comb as claimed in claim 3, wherein the utility member and the splint member are connected together by snap-fitting.

12. A comb as claimed in claim 1, wherein the handle of the comb formed by the splint member is void of teeth.

13. A method of manufacture of a hair comb, comprising the steps of:
manufacturing a utility portion of the comb consisting of only a single row of teeth defining a longitudinal length by injecting only a first polymeric material selected from the group consisting of ethylene-vinyl acetate (EVA), polyurethane (PU) and polyethylene (PE) into a corresponding mould, wherein the first polymeric material and the physical configuration of the utility member are configured such that the formed utility portion has a flexural strength of 31 Mpa ±10% and a hardness of Shore D 55 ±10%; and
manufacturing a splint portion including a first portion that couples to the utility portion along the longitudinal length that provides rigidity to the utility portion and a second portion that extends from the first portion and past the utility portion that forms a handle of the comb for a grip of the user by injecting only a second polymeric material that differs from the first polymetric material selected from the group consisting of general purpose polystyrene polymer (GPPS), high impact polystyrene (HIPS), acrylic, acrylonitrile butadiene (ABS), nylon, polyoxymethylene (POM) and acetate into a mould, wherein the second polymeric material and the physical configuration of the splint portion are configured such that the formed splint portion is stiffer and harder than the utility portion and has a flexural strength of at least 40 Mpa and a hardness of at least Shore D 75.

14. A method as in claim 13, further comprising forming a connection means for connecting the utility portion and the splint portion, the connection means comprising a socket provided in the splint portion for receiving the utility portion and configured such that during assembly the utility portion is slid in a lateral direction into a groove portion defined by the socket and after assembly the utility member is prevented from disengagement from the splint portion in a direction perpendicular to the lateral direction.

15. A method as in claim 14, wherein the utility member extends out from the socket of the splint member in the direction perpendicular to the lateral direction along its entire length in the lateral direction after assembly of the utility portion and the splint portion.

16. A method as in claim 14, wherein the splint member includes a pair of oppositely facing lips defining a gap therebetween that extends along the lateral direction and is in communication with the groove, and wherein the utility member protrudes through the gap and extends along an outer surface of the lips after assembly of the utility portion and the splint portion.

17. A method as in claim 14, wherein the socket of the splint member includes a gap that extends along the lateral direction and defines an opening into the socket, and wherein the utility member includes a portion that is exterior to the socket after assembly of the utility portion and the splint portion and is wider than the gap portion.

18. A method as in claim 13, wherein injecting a second polymeric material into a mould comprises overmolding the second polymeric material onto the first polymeric material.

19. A hair comb comprising:
a utility member consisting of only a single row of teeth defining a longitudinal length made of only a first polymeric material for engaging hair and scalp of a user in use, and
a splint member including a first portion that that is connected to the utility member along the longitudinal length that provides rigidity to the utility member and a second portion that extends from the first portion and past the utility member that forms a handle of the comb for a grip of the user and defines a free end spaced from the utility member, the splint member being made of only a second material for providing rigidity to the utility member that differs from the first polymetric material,
wherein the first polymeric material is selected from the group consisting of ethylene-vinyl acetate (EVA), polyurethane (PU) and polyethylene (PE), and the second material is selected from the group consisting of general purpose polystyrene polymer (GPPS), high impact polystyrene (HIPS), acrylic, acrylonitrile butadiene (ABS), nylon, polyoxymethylene (POM) and acetate,
wherein the splint member is stiffer and harder than the utility member;
wherein the first polymeric material and the physical configuration of the utility member are configured such that the utility member has a flexural strength of 31 Mpa ±10% and a hardness of Shore D 55 ±10%, and the second material and the physical configuration of the splint member are configured such that the splint member has a flexural strength of at least 40 Mpa and a hardness of at least Shore D 75; and
wherein the hair comb further comprises connection means for connecting the utility member and the splint member together, the connection means comprising a socket provided in the splint member for receiving the utility member and configured such that during assembly the utility member is slid in a lateral direction into a groove portion defined by the socket and after assembly the utility member is prevented from disengagement from the splint member in a direction perpendicular to the lateral direction.

20. A comb as claimed in claim 19, wherein the utility member extends out from the socket of the splint member in the direction perpendicular to the lateral direction along its entire length in the lateral direction after assembly of the utility member and the splint member.

21. A comb as claimed in claim 19, wherein the splint member includes a pair of oppositely facing lips defining a gap therebetween that extends along the lateral direction and is in communication with the groove, and wherein the utility member protrudes through the gap and extends along an outer surface of the lips after assembly of the utility member and the splint member.

22. A comb as claimed in claim 19, wherein the socket of the splint member includes a gap that extends along the lateral direction and defines an opening into the socket, and wherein the utility member includes a portion that is exterior to the socket after assembly of the utility member and the splint member and is wider than the gap portion.

\* \* \* \* \*